US012785122B2

(12) United States Patent
You et al.

(10) Patent No.: US 12,785,122 B2
(45) Date of Patent: Nov. 3, 2026

(54) METHOD AND SYSTEM FOR CONTROLLING AIR COMPRESSOR OF FUEL CELL SYSTEM

(71) Applicants: HYUNDAI MOTOR COMPANY, Seoul (KR); KIA CORPORATION, Seoul (KR)

(72) Inventors: Chang Seok You, Hwaseong-si (KR); Joo Yeon Kim, Seoul (KR); Sung Do Kim, Seoul (KR); Min Su Kang, Paju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 991 days.

(21) Appl. No.: 17/948,493

(22) Filed: Sep. 20, 2022

(65) Prior Publication Data

US 2023/0282853 A1 Sep. 7, 2023

(30) Foreign Application Priority Data

Mar. 4, 2022 (KR) ........................ 10-2022-0028374

(51) Int. Cl.
*H02P 1/00* (2006.01)
*H01M 8/0438* (2016.01)
*H01M 8/04537* (2016.01)
*H01M 8/04746* (2016.01)
*H02P 3/00* (2006.01)

(52) U.S. Cl.
CPC ... *H01M 8/04776* (2013.01); *H01M 8/04425* (2013.01); *H01M 8/04567* (2013.01); *H01M 8/04589* (2013.01)

(58) Field of Classification Search
CPC ................................................ H01M 8/04298
USPC ......................................................... 318/268
See application file for complete search history.

(56) References Cited

U.S. PATENT DOCUMENTS 9,819,294 B2 * 11/2017 Park ........................ H02P 23/26
2002/0088654 A1 7/2002 Blum
2010/0149707 A1 * 6/2010 Folts ...................... H01B 12/16 505/779
2015/0207438 A1 * 7/2015 Takami ..................... H02P 6/28 318/400.06
2018/0131308 A1 * 5/2018 Kashima ................... H02P 6/20
2021/0229654 A1 * 7/2021 Matsubara .............. B60L 15/20

FOREIGN PATENT DOCUMENTS

JP 2001-339810 A 12/2001
JP 2002-027616 A 1/2002
JP 2007-141566 A 6/2007
JP 2011-187391 A 9/2011
(Continued)

*Primary Examiner* — Erick D Glass
(74) *Attorney, Agent, or Firm* — MCDONNELL BOEHNEN HULBERT & BERGHOFF LLP

(57) ABSTRACT

A method and system for controlling an air compressor of a fuel cell system is capable of increasing the output of the air compressor motor while preventing a voltage drop of the fuel cell stack by limiting the rotation speed of the air compressor motor according to a demand output and at the same time limiting the phase current and power consumption of the motor when the demand output of a vehicle equipped with the fuel cell system is changed.

10 Claims, 5 Drawing Sheets

(56) References Cited

FOREIGN PATENT DOCUMENTS

| | | | |
|---|---|---|---|
| JP | 2021-181758 | A | 11/2021 |
| KR | 2009-0097958 | A | 9/2009 |
| KR | 2016-0142551 | A | 12/2016 |
| KR | 2020-0119476 | A | 10/2020 |

* cited by examiner

METHOD AND SYSTEM FOR CONTROLLING AIR COMPRESSOR OF FUEL CELL SYSTEM

CROSS REFERENCE TO RELATED APPLICATIONS

The present application claims priority to Korean Patent Application No. 10-2022-0028374, filed Mar. 4, 2022, the entire contents of which is incorporated herein for all purposes by this reference.

BACKGROUND

Field of the Disclosure

The present disclosure relates to a method and system for controlling an air compressor of a fuel cell system, and more particularly, to a method and system for controlling an air compressor of a fuel cell system capable of increasing the output of an air compressor motor while preventing a voltage drop of the fuel cell stack by limiting the rotation speed of the air compressor motor according to a demand output and at the same time limiting the phase current and power consumption of the motor when the demand output of a vehicle equipped with the fuel cell system is changed.

Description of the Related Art

A fuel cell is a device that receives hydrogen and air from an outside and generates electrical energy through an electrochemical reaction inside a fuel cell stack, and it can be used as a power source for driving a motor of an ecofriendly vehicle such as a fuel cell electric vehicle (FCEV).

A fuel cell vehicle includes a fuel cell stack in which a plurality of fuel cell cells used as a power source is stacked, a fuel supply system for supplying hydrogen as fuel to the fuel cell stack, an air supply system for supplying oxygen, an oxidizing agent required for electrochemical reactions, and a water and heat management system for controlling the temperature of the fuel cell stack.

The fuel supply system depressurizes compressed hydrogen inside a hydrogen tank and supplies it to the anode (fuel electrode) of the fuel cell stack, and the air supply system operates an air compressor to supply inhaled outside air to the cathode (air electrode) of the fuel cell stack.

When hydrogen is supplied to the anode of the fuel cell stack and oxygen is supplied to the cathode, hydrogen ions are separated from the anode through a catalytic reaction. The separated hydrogen ions are transferred to the cathode, which is the air electrode, through the electrolyte membrane, and at the cathode, the hydrogen ions separated from the anode, electrons, and oxygen cause an electrochemical reaction together to obtain electrical energy. Specifically, the electrochemical oxidation of hydrogen occurs at the anode, and the electrochemical reduction of oxygen occurs at the cathode. At this time, electricity and heat are generated due to the movement of generated electrons, and water vapor or water is generated by the chemical reaction between hydrogen and oxygen.

An exhaust device is provided to discharge unreacted hydrogen and oxygen with byproducts such as water vapor, water and heat generated during the process of generating electric energy of the fuel cell stack, and the gases such as water vapor, hydrogen and oxygen are discharged into the atmosphere through an exhaust passage.

Components such as an air compressor and a hydrogen tank for driving the fuel cell are connected to a main bus terminal to facilitate starting the fuel cell, and various relays for facilitating power cutoff and connection and diodes for preventing reverse current from flowing to the fuel cell may be connected to the main bus terminal.

The dry air supplied through the air compressor is humidified through a humidifier, and then supplied to the cathode of the fuel cell stack. The exhaust gas of the cathode in a humidified state by the water component generated inside is transferred to the humidifier, and can be used to humidify the dry air to be supplied to the cathode by the air compressor.

Such an air compressor may include a motor and magnetic rotor for generating rotational force and a blade for air suction.

On the other hand, when a driver requests high power while driving a fuel cell vehicle, the voltage of the cells in the fuel cell stack momentarily drops, and the current limiting function to protect the fuel cell stack operates, causing the vehicle to stumble and limit acceleration (the so-called 'stumbling' phenomenon due to temporary output drop).

This is because, when the driver attempts to accelerate the vehicle, a fuel-cell control unit transmits a motor rotation speed increasing command to an air compressor controller and at the same time transmits a temporary current limit command to the driving motor controller of the vehicle.

That is, while the current consumption momentarily increases in the air compressor, the voltage drop of the fuel cell stack is caused by the instantaneous current output demand in the fuel cell stack.

In addition, in a state in which the performance of the fuel cell stack is deteriorated due to long-term use and the voltage of the fuel cell stack is lowered compared to a normal state, a vicious cycle of additional voltage drop occurs. That is, when excessive power is supplied to drive the air compressor in a state in which the performance of the fuel cell stack is deteriorated, the fuel cell stack has a problem in that an additional voltage drop is accumulated due to more current output.

The matters described as the background art above are only for improving the understanding of the background of the present disclosure, and should not be taken as acknowledging that they correspond to the prior art already known to those of ordinary skill in the art.

SUMMARY

The present disclosure has been proposed to solve this problem, and is to provide a method and system for controlling an air compressor of a fuel cell system capable of increasing the output of an air compressor motor while preventing a voltage drop of the fuel cell stack by limiting the rotation speed of the air compressor motor according to a demand output and at the same time limiting the phase current and power consumption of the motor when the demand output of a vehicle equipped with the fuel cell system is changed.

In order to achieve the above object, a method for controlling an air compressor of a fuel cell system according to the present disclosure includes the steps of deriving a target speed command value of an air compressor motor and a phase current command value required for driving the motor based on a rotation speed of the motor by a control unit, deriving a speed limit value for limiting the target speed command value and a phase current limit value for limiting the phase current command value based on a sensing voltage of the motor by the control unit, deriving a final phase current command value based on the target speed command value, the speed limit value, the phase current command value, and the phase current limit value by the control unit, and controlling the air compressor motor according to the final phase current command value by the control unit In the step of deriving the target speed command value of the method for controlling an air compressor of a fuel cell system according to the present disclosure, the rotation speed of the motor may be a target speed of the motor.

In the step of deriving the phase current command value of the method for controlling an air compressor of a fuel cell system according the present disclosure, the rotation speed of the motor may be a current speed of the motor.

In the step of deriving the speed limit value and the phase current limit value of the method for controlling an air compressor of a fuel cell system according to the present disclosure, if the sensing voltage of the motor is less than a reference voltage, the speed limit value may be determined according to a preset speed limit value.

In the step of deriving the speed limit value and the phase current limit value of the method for controlling an air compressor of a fuel cell system according to the present disclosure, if the sensing voltage of the motor is less than a reference voltage, the phase current limit value may be determined according to a preset limit current value.

In the step of deriving the speed limit value and the phase current limit value of the method for controlling an air compressor of a fuel cell system according to the present disclosure, the phase current limit value may be divided into a first phase current limit value and a second phase current limit value according to a difference between a target speed and current speed of the motor, the control unit may derive the first phase current limit value if the difference between the target speed and current speed of the motor is large, and derive the second phase current limit value if the difference between the target speed and the current speed is small.

In the step of deriving the speed limit value and the phase current limit value of the method for controlling an air compressor of a fuel cell system according to the present disclosure, a power consumption limit value of the motor may be determined according to a preset limit current value if the sensing voltage of the motor is less than a reference voltage, and the second phase current limit value may be calculated and derived based on the determined power consumption limit value and a back electromotive force according to the current speed of the motor.

In the step of deriving the speed limit value and the phase current limit value of the method for controlling an air compressor of a fuel cell system according to the present disclosure, the back electromotive force may be derived from an electric angular velocity according to the current speed of the motor, and the derived back electromotive force and the power consumption limit value of the motor may be applied to a voltage equation of the motor to derive the second phase current limit value.

The step of deriving the final phase current command value of the method for controlling an air compressor of a fuel cell system according to the present disclosure may include the steps of deriving a final speed command value from the target speed command value and the speed limit value by the control unit, deriving a final phase current limit value from the final speed command value and the phase current limit value by the control unit, and deriving the final phase current command value from the final phase current limit value and a phase current specified value by the control unit.

In the step of controlling the air compressor motor of the method for controlling an air compressor of a fuel cell system according to the present disclosure, a voltage command of the motor may be generated according to the final phase current command value, and the air compressor motor may be controlled according to a duty ratio corresponding to the generated voltage command.

A system for controlling an air compressor of a fuel cell system according to the present disclosure includes a command value derivation unit for deriving a target speed command value of an air compressor motor and a phase current command value required for driving the motor based on a rotation speed of the motor, a limit value derivation unit for deriving a speed limit value limiting the target speed command value and a phase current limit value limiting the phase current command value based on a sensing voltage of the motor, a final value derivation unit for deriving a final phase current command value based on the target speed command value, the speed limit value, the phase current command value and the phase current limit value, and a motor control unit for controlling the air compressor motor according to the final phase current command value.

The system for controlling an air compressor of a fuel cell system according to the present disclosure may further include a high-level control unit for deriving the target speed command value of the motor based on the rotation speed of the air compressor motor and transmitting the derived target speed command value to the command value derivation unit and the final value derivation unit, and the command value derivation unit may derive the phase current command value required for driving the motor based on the target speed command value received from the high-level control unit and the rotation speed of the air compressor motor.

According to the method and system for controlling an air compressor of a fuel cell system of the present disclosure, when the demand output of a vehicle equipped with a fuel cell system is changed, the rotation speed of the air compressor motor is limited according to a demand output, and at the same time, the phase current and power consumption of the motor is limited, thereby increasing the output of the air compressor motor while preventing the voltage drop of the fuel cell stack.

DETAILED DESCRIPTION

Throughout this specification, when a part "includes" a certain component, it means that other components may be further included, rather than excluding other components, unless otherwise stated.

In addition, terms such as first and/or second may be used to describe various components, but these terms are used only for the purpose of distinguishing one component from another component, for example, without departing from the scope of the present disclosure, a first component may be called a second component, and similarly the second component may also be referred to as the first component.

Hereinafter, the configuration and operating principle of various embodiments of the disclosed disclosure will be described in detail with reference to the accompanying drawings.

Figure 1:
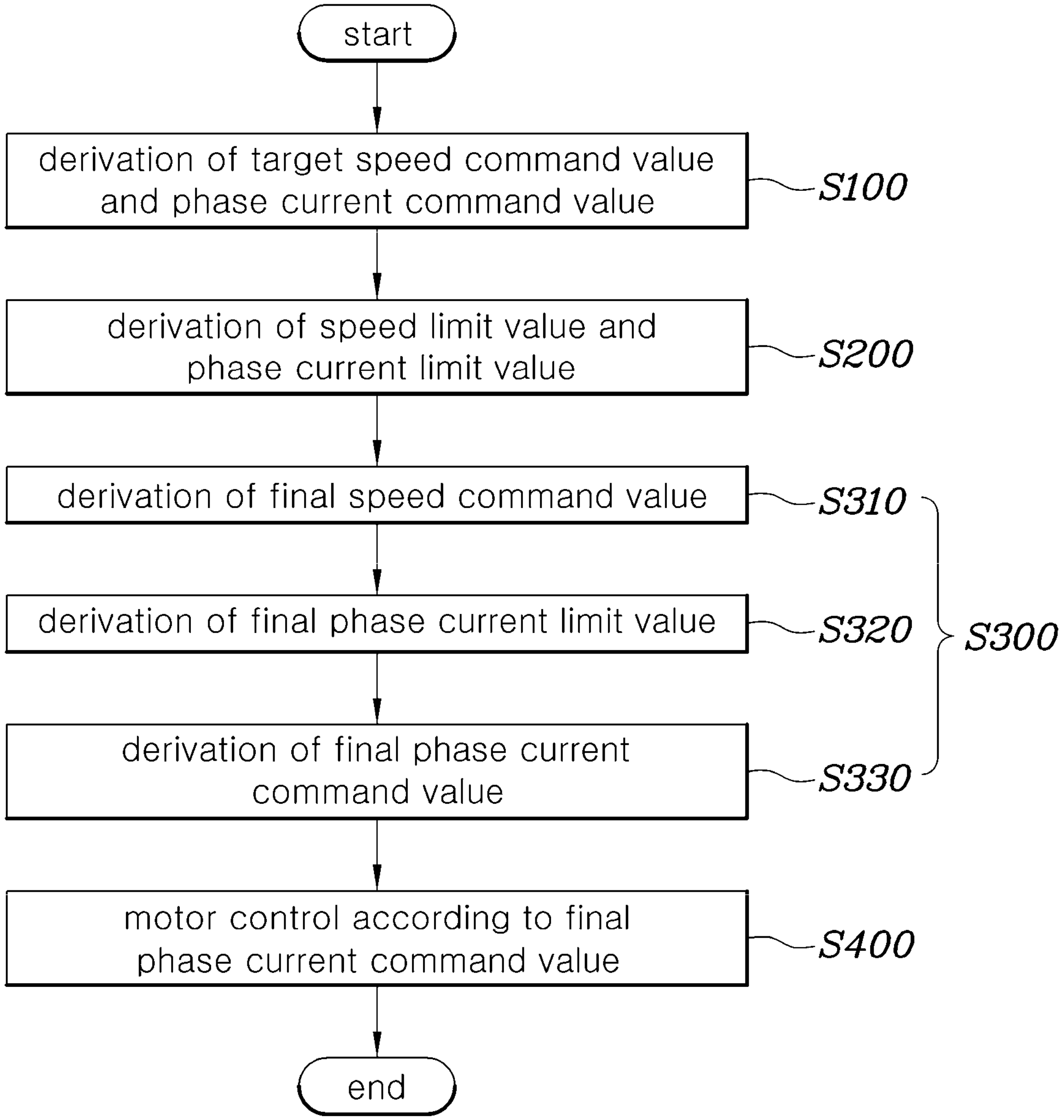
FIG. 1 is a flowchart of a method for controlling an air compressor of a fuel cell system according to an embodiment of the present disclosure.
Figure 2:
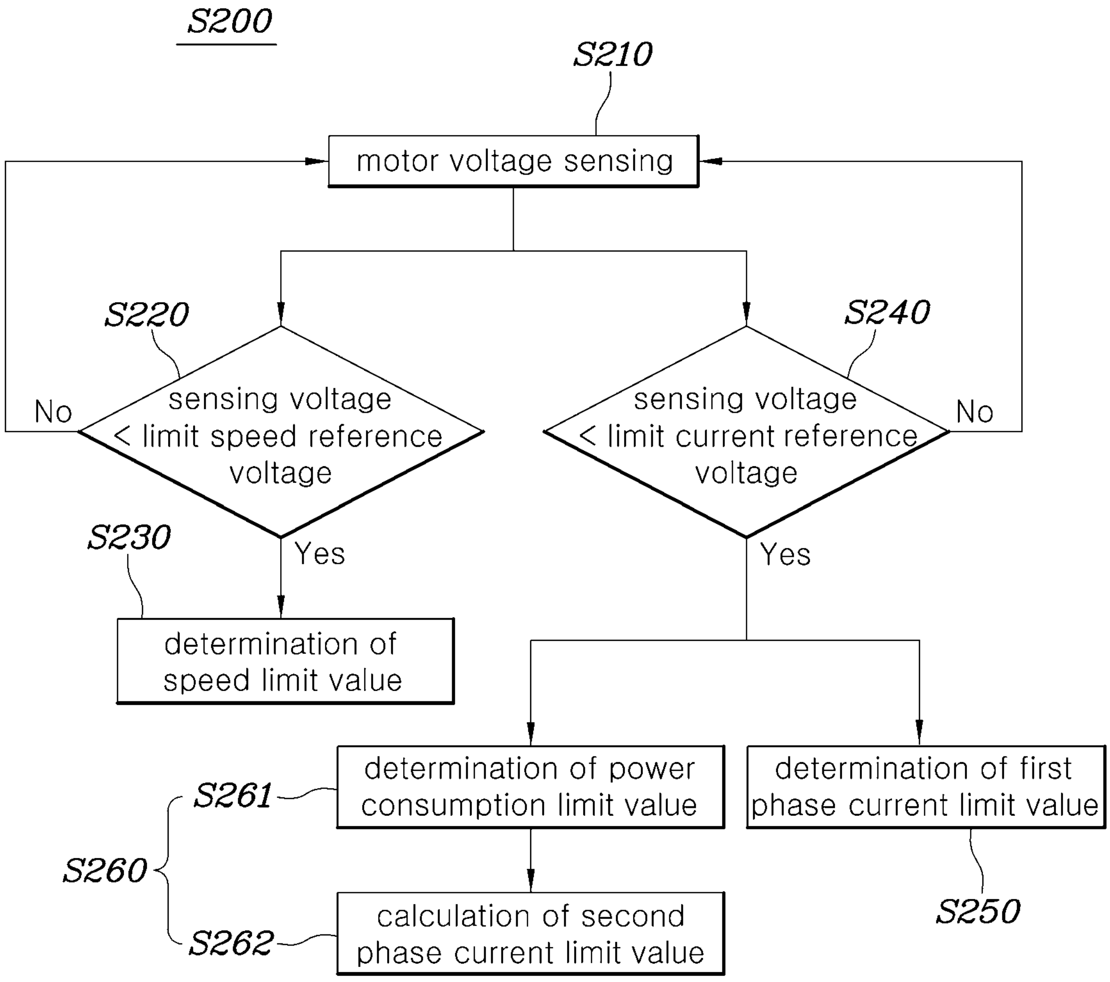
FIG. 2 is a flowchart illustrating a process of deriving a speed limit value and a phase current limit value in FIG. 1.
Figure 3:
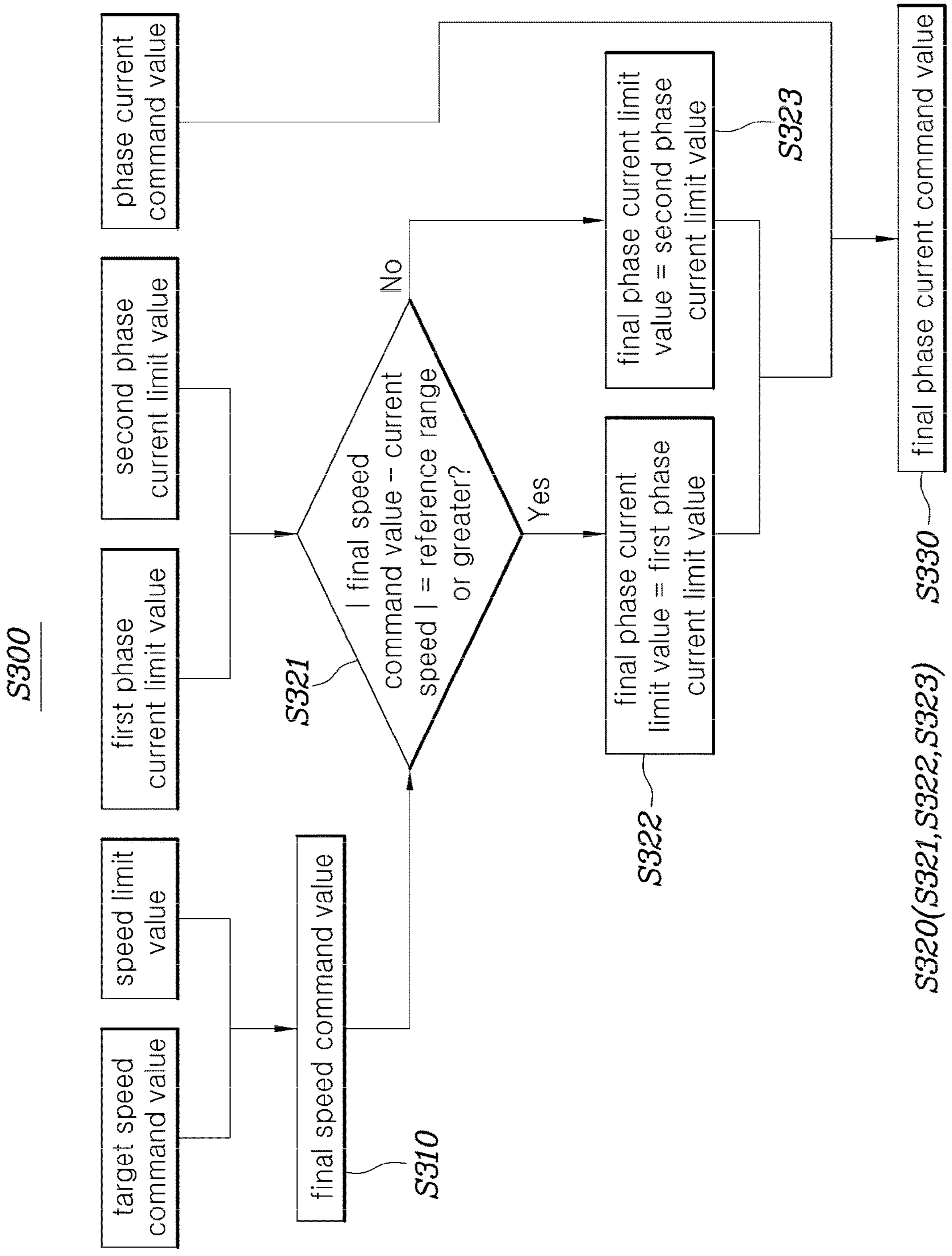
FIG. 3 is a flowchart illustrating a process of deriving a final speed command value, a final phase current limit value, and a final phase current command value in FIG. 1.
Figure 4:
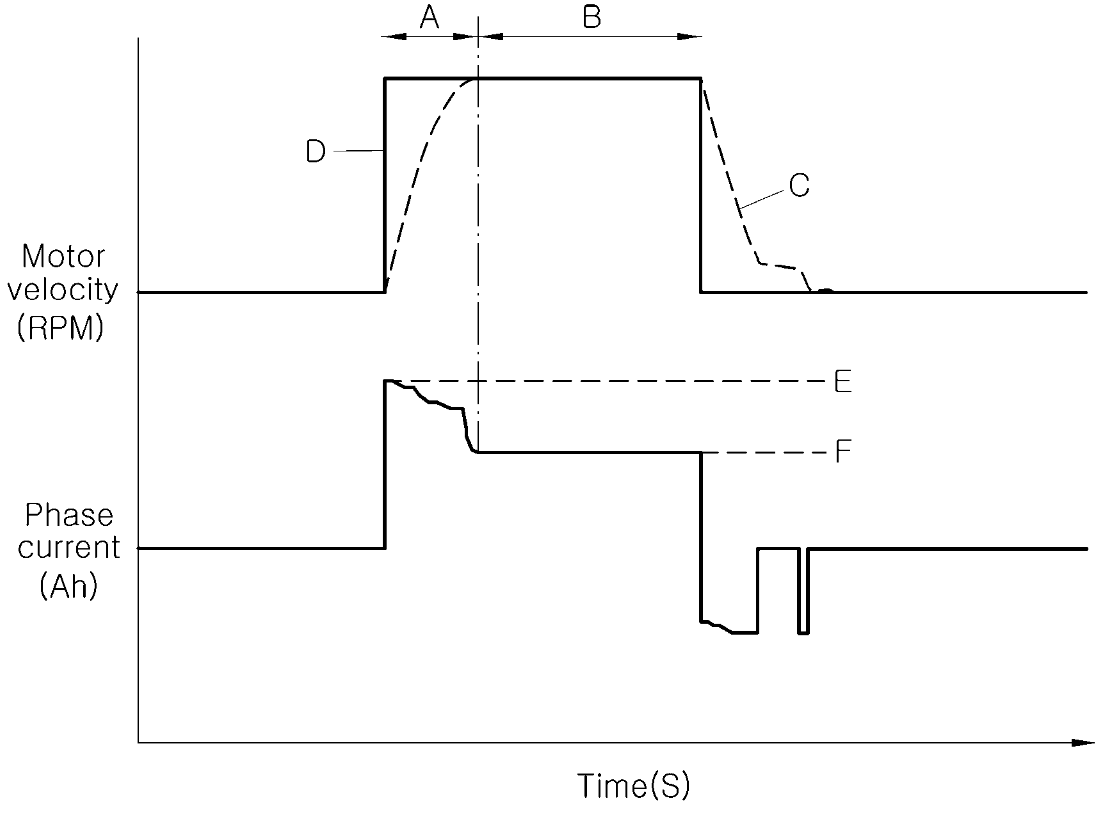
FIG. 4 is a graph showing a change in a rotational speed of a motor and a change in a phase current over time.
Figure 5:
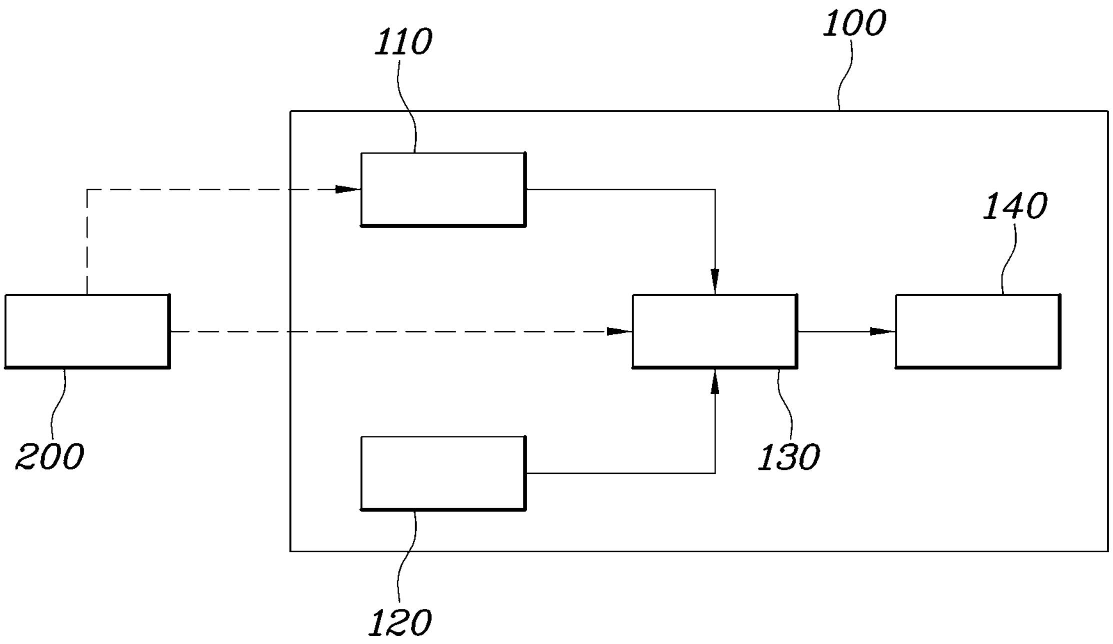
FIG. 5 is a view showing a system for controlling an air compressor of a fuel cell system according to an embodiment of the present disclosure.

FIG. 1 is a flowchart of a method for controlling an air compressor of a fuel cell system according to an embodiment of the present disclosure, FIG. 2 is a flowchart illustrating a process of deriving a speed limit value and a phase current limit value in FIG. 1, FIG. 3 is a flowchart illustrating a process of deriving a final speed command value, a final phase current limit value, and a final phase current command value in FIG. 1, FIG. 4 is a graph showing a change in a rotational speed of a motor and a change in a phase current over time, FIG. 5 is a view showing a system for controlling an air compressor of a fuel cell system according to an embodiment of the present disclosure.

In order to help the understanding of the present disclosure, a configuration of a general fuel cell system and a conventional control method for controlling the same will be briefly described, and differential features of each component and step of the present disclosure will be described together.

A fuel cell system includes a fuel cell stack in which a plurality of fuel cells is stacked, a fuel supply system for supplying hydrogen used as fuel to the anode of the fuel cell stack, an air supply system for supplying oxygen required for an electrochemical reaction to the cathode of the fuel cell stack, and the like.

In particular, the air supply system operates an air compressor to suck in the outside air supplied to the cathode of the fuel cell stack. That is, such an air compressor is generally configured to include a motor and magnetic rotor for generating rotational force and a blade for air suction.

Meanwhile, in the fuel cell system, the voltage of the fuel cell stack (hereinafter, referred to as 'stack voltage') corresponds to a very important factor determining the performance of the fuel cell system.

Specifically, when the performance of one unit cell or a plurality of cells deteriorates due to the aging of the fuel cell stack, each cell becomes in a state in which it cannot generate additional current, and a phenomenon in which the stack voltage of the entire fuel cell stack drops occurs. In such a state, if the current generation of the entire fuel cell stack is unreasonably required, a cell whose performance has deteriorated compared to other cells will experience a rapid additional performance degradation.

In addition, hot spots due to deterioration and pin holes resulting therefrom occur in the electrolyte membrane of the cell with additional performance degradation, which not only causes loss of cell function, but also greatly reduces the performance of the entire fuel cell stack.

In order to detect and respond to such a problem, a general fuel cell system is configured to generate a fault code signal in a fuel-cell control unit (FCU) when the stack voltage drops below a certain level.

Here, it can be understood that the fuel-cell control unit serves as a higher level controller that regulates the overall output of the fuel cell system by controlling the supply amount of hydrogen and air to satisfy a demand output when a driver requests an output change such as when the driver attempts to accelerate the vehicle in the fuel cell vehicle. Such a fuel-cell control unit may transmit a command signal for satisfying a demand output to an air compressor controller that controls the air compressor to control an air supply amount.

For example, in the fuel cell vehicle, when a driver attempts to accelerate the vehicle, the fuel-cell control unit transmits a motor rotation speed increasing command to the air compressor controller and a temporary current limit command to the driving motor controller of the vehicle.

At this time, a problem in which the output of the driving motor is lowered due to abrupt current limitation (so-called 'stumbling' problem in which vehicle acceleration is limited due to a temporary output drop) occurs.

In other words, a speed command is transmitted to increase the rotation speed of the air compressor motor for additional supply of air, and the air compressor controller instantaneously injects a large amount of current into the air compressor motor while following the speed command.

Accordingly, when the driver attempts to accelerate the vehicle, the current consumption momentarily increases in the air compressor, while the stack voltage decreases due to the instantaneous current output in the fuel cell stack.

In fact, when the current consumption of the air compressor motor increases for instantaneous vehicle acceleration in a typical fuel cell vehicle, as the stack voltage drops below a certain level, a fault code signal is generated in the fuel-cell control unit (FCU).

This problem occurs more frequently during rapid acceleration in a low voltage operation mode in which a demand output is not high. That is, there a need for developing a technology capable of preventing the stack voltage drop in the low voltage operation mode. However, the present disclosure is not necessarily limited to the low voltage operation mode state, and may be even applied to a normal operation depending on circumstances if the stack voltage falls below a certain level.

Accordingly, a method for controlling an air compressor of a fuel cell system according to the present disclosure is to provide a control method capable of increasing the output of the air compressor motor while preventing a drop of the stack voltage by limiting the rotation speed of the air compressor motor according to a demand output and simultaneously limiting the phase current and power consumption of the fuel cell to secure the minimum voltage for driving the fuel cell stack when instantaneous vehicle acceleration is required.

In addition, the air compressor control system of the fuel cell system according to the present disclosure is configured with a control unit 100 including a command value derivation unit 110, a limit value derivation unit 120, a final value derivation unit 130 and a motor control unit 140 to implement the above control method.

Here, the control unit 100 may be understood to refer to the aforementioned air compressor controller. Therefore, the motor control unit 140 of the air compressor controller can be understood as meaning a sub-controller that directly controls the air compressor motor. However, this is only an example to help the understanding of the present disclosure, and the content of the present disclosure is not limited by these exemplary descriptions. That is, unlike this, a host controller may be included. For example, according to changes in various design conditions, the control unit 100 may include a fuel-cell control unit that is a higher level controller.

Hereinafter, with reference to the accompanying drawings, the key features of each step and components of the present disclosure will be described in more detail.

Referring to FIG. 1, the method for controlling the air compressor of the fuel cell system according to the present disclosure includes the steps of deriving a target speed command value of the motor and a phase current command value required for driving the motor based on the rotation speed of the air compressor motor by the control unit at S100, deriving a speed limit value limiting the target speed command value and a phase current limit value limiting the phase current command value based on the sensing voltage of the motor by the control unit at S200, deriving a final phase current command value based on the target speed command value, the speed limit value, the phase current command and the phase current limit value by the control unit at S300, and controlling the air compressor motor according to the final phase current command value by the control unit at S400.

In addition, in the step S100 of deriving the target speed command value of the method for controlling the air compressor of the fuel cell system according to the present disclosure, the rotational speed of the motor may be the target speed of the motor.

That is, when the driver requests an output change, such as when the driver attempts to accelerate the vehicle in the fuel cell vehicle, the control unit 100 derives the target speed command value of the motor based on the target speed of the air compressor motor to satisfy a demand output.

This target speed command value is used to derive the phase current command value of the motor, and may be limited to a reference speed or less by a speed limit value derived later.

In order to help the understanding of the present disclosure, the phase current will be briefly described. The motor included in the air compressor mainly uses a permanent magnet synchronous motor (PMSM). The permanent magnet synchronous motor is generally composed of a rotor having three permanent magnets arranged at intervals of 120° therein, and a stator including a coil winding to which current can be applied.

That is, by applying a current to the winding of the stator to generate magnetic flux between the permanent magnet and the winding, the rotor is rotated, thereby generating torque by the rotational force. At this time, in order to rotate the rotor, it is necessary to sequentially generate magnetic flux in each of the three permanent magnets built into the rotor. In this case, it is obvious that the direction of magnetic flux should be formed in the same direction as the rotation direction.

Accordingly, three currents are sequentially applied to the coil windings respectively adjacent to the three permanent magnets, and this is generally referred to as a three-phase current. In the present specification, the three-phase current is expressed as 'phase current' and will be described without distinguishing it.

That is, the phase current in the present disclosure can be understood as meaning the 'current that must be applied to the inside of the motor to realize the target speed of the air compressor motor to satisfy a demand output'.

Accordingly, the control unit 100 of the method for controlling the air compressor of the fuel cell system according to the present disclosure derives the phase current command value based on the previously derived target speed command value.

In addition, the target speed command value and the phase current command value derived in this way may be limited by the speed limit value and the phase current limit value derived based on the sensing voltage of the motor, respectively at S200.

That is, by limiting the target speed command value with the speed limit value in order to limit the rotation speed of the air compressor motor, and at the same time additionally limiting the phase current of the motor, this is not only to secure a minimum voltage for driving the fuel cell stack, but also to prevent a drop in the stack voltage.

Here, the reason for deriving the speed limit value and the phase current limit value based on the sensing voltage of the motor is as follows. As mentioned above, the stack voltage drop problem is particularly problematic in the low voltage operation mode. Therefore, in the case of the low voltage operation mode, it is necessary to ensure a minimum voltage for driving the fuel cell stack. That is, the case where the sensing voltage of the motor is below the reference voltage is primarily determined so that the control method according to the present disclosure is essentially performed in the low voltage operation mode, and the speed limit value and the phase current limit value are derived based on this.

For reference, the function of limiting the rotation speed of the air compressor motor has been applied to the conventional fuel cell system control method. However, this is a function for preemptively preventing a problem of inability to operate at high speed due to insufficient voltage margin when the input voltage to the air compressor motor is insufficient, which is different from the function or purpose of preventing the drop of the stack voltage according to the present disclosure.

As a result, the present disclosure has the effect of preventing the stack voltage from dropping by additionally limiting the phase current of the motor in addition to the conventional speed limiting function of the motor.

Furthermore, in the method for controlling the air compressor of the fuel cell system according to the present disclosure, the control unit derives the final phase current command value based on the previously derived target speed command value, speed limit value, phase current command value and phase current limit value at S300. Then, by controlling the air compressor motor according to the derived final phase current command value at S400, the above effect is obtained.

In relation to the detailed operating principle or technical characteristics in each step, the following will be sequentially described.

In the step S100 of deriving the phase current command value of the method for controlling the air compressor of the fuel cell system according to the present disclosure, the rotation speed of the motor may be the current speed of the motor.

As described above, the phase current in the present disclosure can be understood to mean the 'current that must be applied to the inside of the motor to realize the target speed of the air compressor motor to satisfy a demand output'.

However, since the rotation speed of the motor is divided into the target speed and the current speed, it is preferable to understand that the 'current to be applied to the inside of the motor' means the 'current additionally applied according to the difference between the target speed and the current speed'.

That is, in the step S100 of deriving the phase current command value of the method for controlling the air compressor of the fuel cell system according to the present disclosure, the phase current command value is derived by the target speed command value derived based on the difference between the current speed and target speed of the motor and the target speed.

The phase current command value derived in this way is limited by the phase current limit value derived later and is derived as the final phase current command value for controlling the air compressor motor (S200, S300), thereby limiting the phase current of the motor. Accordingly, it is possible to secure the output of the air compressor motor while preventing the stack voltage from dropping.

FIG. 2 is a flowchart illustrating a process of deriving the speed limit value and the phase current limit value in FIG. 1.

Referring to FIG. 2, in the step S200 of deriving the speed limit value and the phase current limit value of the method for controlling the air compressor of the fuel cell system according to the present disclosure, if the sensing voltage of the motor is less than a reference voltage, the speed limit value can be determined according to the preset limit speed value (S210, S220, S230).

In addition, in the step S200 of deriving the speed limit value and the phase current limit value of the method for controlling the air compressor of the fuel cell system according to the present disclosure, if the sensing voltage of the motor is less than a reference voltage, the phase current limit value can be determined according to a preset limit current value (S210, S240, S250, S260).

This is to first determine the case where the sensing voltage of the motor is less than or equal to a reference voltage and derive the speed limit value and the phase current limit value so that the control method according to the present disclosure is essentially performed in a low voltage operation mode.

Here, the reference voltage, the speed limit value and the limit current value are data accumulated through various experiments in advance, and are understood to refer to the values stored in a memory built in the control unit of the method for controlling the air compressor of the fuel cell system according to the present disclosure.

For example, in the case of limiting the rotation speed of the air compressor motor to 25% of a maximum drivable speed in a low voltage operation mode, the reference voltage is set to the voltage value applied for the speed output corresponding to ¼ of the maximum drivable speed, the limit speed value is set to a speed value corresponding to ¼ of the maximum drivable speed, and the limit current value is set to a current value applied for the speed output corresponding to ¼ of the maximum drivable speed.

On the other hand, if the sensing voltage of the motor is greater than or equal to the reference voltage, the voltage sensing process of the motor is performed again. The voltage sensing of the motor that is repeatedly performed in this way can be executed as a 1 ms task.

For reference, when the control method according to the present disclosure is to be executed only in the case of the low voltage operation mode, the voltage sensing process of the motor may serve to start the limited operation in the low voltage operation mode. Then, since it is necessary to release the limited operation after the control of the air compressor motor is terminated according to the control method of the present disclosure, it is obvious that a separate process of determining the releasing criteria of the limited operation can be additionally performed.

Here, it is preferable that the releasing criteria of the limited operation forms a predetermined band gap with the reference voltage of the sensing voltage in order to avoid hysteresis. That is, this is to avoid system failures that may be caused by sensor errors or various noises when the start condition and the release condition are set as the same standard.

FIG. 2 is a flowchart showing the process of deriving the speed limit value and the phase current limit value in FIG. 1, FIG. 3 is a flowchart showing the process of deriving the final speed command value, the final phase current limit value and the final phase current command value in FIG. 1, and FIG. 4 is a graph showing a change in the rotational speed of the motor and a change in the phase current over time.

Referring to FIGS. 2 to 4, in the step S200 of deriving the speed limit value and the phase current limit value of the method for controlling the air compressor of the fuel cell system according to the present disclosure, the phase current limit value is divided into a first phase current limit value and a second phase current limit value according to the difference between the target speed and current speed of the motor. The control unit may derive the first phase current limit value if the difference between the target speed and current speed of the motor is large, and the control unit may derive the second phase current limit value if the difference between the target speed and the current speed is small.

Referring to FIG. 4, when the driver of the fuel cell vehicle attempts to accelerate the vehicle, the rotation speed of the motor rapidly increases in the form of a quadratic function over time and remains constant when the target speed is reached. On the other hand, the phase current rapidly increases at the starting point of vehicle acceleration, and then decreases gradually or is maintained at a constant current value.

Here, C refers to the current speed of the motor, and D refers to the target speed of the motor. Accordingly, it can be understood that A denotes a section in which the difference between the target speed and the current speed is large, and B denotes a section in which the difference between the target speed and the current speed is small.

That is, the first phase current limit value is derived in section A and the second phase current limit value is derived in section B. The reason why the first phase current limit value and the second phase current limit value are separately derived by dividing the sections A and B in this way is as follows.

The air compressor generally uses airfoil bearings. The airfoil type bearing refers to a type of bearing in which lubrication is performed by using an air fluid having viscosity without using lubricating oil. That is, when the operation of the airfoil type bearing is started, an air layer for lubrication is formed. In order to form such an air layer, the restraint state of the bearing must be released before operation starts. In other words, when the air compressor is initially driven, a torque capable of releasing the restrained state of the airfoil bearing is required.

As a result, it is necessary to apply a current of a certain level or more during the initial operation of the air compressor. However, when the entire region in which the air compressor is driven is limited to one current reference, a problem in that the current for initial operation is insufficient occurs.

Therefore, by dividing section A including the initial driving region and section B in which the current speed of the motor is close to the target speed, the first phase current limit value is derived in section A and the second phase current limit value is derived in section B.

Meanwhile, referring to FIGS. 2 and 4, in the step S200 of deriving the speed limit value and the phase current limit value of the method for controlling the air compressor of the fuel cell system according to the present disclosure, if the sensing voltage of the motor is less than the reference voltage, the power consumption limit value of the motor is determined according to a preset current limit value at S261, and the second phase current limit value can be calculated and derived based on the determined power consumption limit value and a back electromotive force according to the current speed of the motor at S262.

Referring further to FIG. 4, E refers to a phase current limit standard of the motor, and F refers to a motor power consumption limit standard.

In this case, since the second phase current limit value is a value derived from the section B where the difference between the target speed and current speed of the motor is small, it can be seen that, unlike section A, power consumption is limited, not the phase current of the motor. However, the second phase current limit value that finally limits the phase current is derived through the 'consumption current—phase current relational expression' including the back electromotive force of the motor for the power consumption limit value. Here, the 'consumption current—phase current relational expression' refers to the following equation.

$$I_{s\_MotCurLim} = \frac{2 \times P_{MotPwrLim}}{3 \times V_{emf} \times \eta_{inv}} \quad \text{Equation 1}$$

where $V_{emf}=\psi\times\omega_e$

In Equation 1, $I_{s\_MotCurLim}$ is the second phase current limit value, $P_{MotPwrLim}$ is the power consumption limit value of the air compressor motor, $V_{emf}$ is the back electromotive force voltage of the air compressor motor, $\psi$ is a back electromotive force constant, $\omega_e$ is the electric angular velocity of the air compressor motor, and $\eta_{inv}$ is the conversion efficiency of the inverter that converts the signals of voltage and current applied to the air compressor motor.

Equation 1 above can be derived from the motor formula using values obtained by transforming the phase voltage and phase current of the motor into d-axis and q-axis coordinates, which will be described in more detail later.

Meanwhile, the reason for limiting the power consumption rather than the phase current of the motor in section B will be described with reference to the following equation.

$$P_{inv}=1.5\times(I_{dsyn}\times V_{dsyn}+I_{qsyn}\times V_{qsyn})\times\eta_{ivn} \quad \text{Equation 2:}$$

Equation 2 shows the 'power consumption calculation formula of the air compressor motor', where $V_{dsyn}$ is the d-axis voltage of the air compressor motor, $V_{qsyn}$ is the q-axis voltage of the air compressor motor, $I_{dsyn}$ is the d-axis current of the air compressor motor, and $I_{qsyn}$ is the q-axis current of the air compressor motor, and $\eta_{inv}$ is the conversion efficiency of the inverter that converts the signals of voltage and current applied to the air compressor motor.

That is, the power consumption of the air compressor motor is calculated by adding the values obtained by multiplying the values obtained by transforming the phase voltage and the phase current on the d-axis and the q-axis, respectively, and multiplying this by the conversion efficiency of the inverter.

Therefore, when only the phase current is limited in section B, the power consumption of the motor is changed when the phase voltage is changed. In this case, even if the phase current is limited, the function of 'prevention of the stack voltage drop', which is the object or effect of the present disclosure, cannot be properly performed as the power consumption fluctuates.

In other words, in section B, it is necessary to limit the power consumption of the air compressor motor in order to secure a minimum voltage for driving the fuel cell stack to prevent a drop in the stack voltage.

For reference, Equation 2 is also applied in section A, but as seen above, in section A, an additional current over a certain level is applied during the initial operation of the air compressor, so a current higher than the phase current to be limited is applied to the motor.

That is, the purpose of section A is to lower the oversupplied current to a level below the limit current value according to a reference voltage, whereas the purpose of section B is to keep the adjusted state constant in the state adjusted to a level adjacent to the limit current value.

Therefore, since the purpose of each section is different, power consumption is limited in section B, which requires more precise control than in section A, and converted into the second phase current limit value to limit a phase current.

Accordingly, referring to FIG. 2, it can be seen that the second phase current limit value is calculated after the power consumption limit value is determined.

Meanwhile, in the step S200 of deriving the speed limit value and the phase current limit value of the method for controlling the air compressor of the fuel cell system according to the present disclosure, the back electromotive force is derived from the electric angular velocity according to the current speed of the motor, and the second phase current limit value can be derived by applying the derived back electromotive force and the motor power consumption limit value to the voltage formula of the motor at S262.

For this, it will be described with reference to the following equation.

$$V_{dsyn} = R_s \times I_{dsyn} + L_d \times \frac{DI_{dsyn}}{dt} - L_q \times \omega_e \times I_{qsyn} \quad \text{Equation 3}$$

$$V_{qsyn} = R_s \times I_{qsyn} + L_q \times \frac{dI_{qsyn}}{dt} + L_q \times \omega_e \times I_{qsyn} + V_{emf}$$

where, $V_{emf}=\psi\times\omega_e$

Equation 3 above shows the 'motor formula using the coordinate conversion values of the phase voltage and phase current of the motor into the d-axis and the q-axis', where $V_{dsyn}$ is the d-axis voltage of the air compressor motor, and $V_{qsyn}$ is the q-axis voltage of the air compressor motor, $I_{dsyn}$ is the d-axis current of the air compressor motor, $I_{qsyn}$ is the q-axis current of the air compressor motor, $R_s$ is the phase resistance, $L_d$ is the d-axis inductance value of the air compressor motor, and $L_q$ is the q-axis inductance value of the air compressor motor, $V_{emf}$ is the back electromotive force voltage of the air compressor motor, $\psi$ is the back electromotive force constant, and $\omega_e$ is the electric angular velocity of the air compressor motor.

As seen above, the power consumption of the air compressor motor is calculated by the conversion efficiency of the inverter and the values obtained by converting the phase voltage and the phase current to the d-axis and the q-axis, respectively. In addition, since a permanent magnet synchronous motor (PMSM) is used in a general air compressor motor, current control is performed only in the q-axis.

Therefore, if only the q-axis component is left in the above Equation 3, and the q-axis voltage is substituted with the back electromotive force component and applied to Equation 2 (the formula for calculating the power consumption of the air compressor motor), Equation 1 (consumption current—phase current relational expression) is derived.

In addition, the back electromotive force here is calculated as the product of the back electromotive force constant and the electric angular velocity of the air compressor motor, where the electric angular velocity may be understood to refer to an electric angular velocity according to the current speed of the motor.

FIG. 1 is a flowchart of a method for controlling an air compressor of a fuel cell system according to an embodiment of the present disclosure.

Referring to FIG. 1, in the method for controlling the air compressor of the fuel cell system according to the present disclosure, the step S300 of deriving the final phase current command value includes the steps of deriving a final speed command value from the target speed command value and the speed limit value by the control unit at S310, deriving a final phase current limit value from the final speed command value and the phase current limit value by the control unit at S320 and deriving the final phase current command value from the final phase current limit value and a phase current specified value by the control unit at S330.

Specifically, in the step S310 of deriving the final speed command value from the target speed command value and the speed limit value by the control unit, the target speed command value derived in the step S100 of deriving the target speed command value and the phase current command value is compared with the speed limit value derived in the step S200 of deriving the speed limit value and the phase current limit value, and the lower value of the target speed command value and the speed limit value may be derived as the final speed command value.

Next, the step S320 of deriving the final phase current limit value from the final speed command value and the phase current limit value by the control unit determines any of the first phase current limit value and the second phase current limit value derived in the step S200 of deriving the speed limit value and the phase current limit value as the final phase current limit value (S321, S322, S323), as shown in FIG. 3.

At this time, in relation to the criterion for determining the final phase current limit value, the previously calculated final speed command value is utilized.

As described above, the control unit derives the first phase current limit value if the difference between the target speed and current speed of the motor is large, and derives the second phase current limit value if the difference between the target speed and the current speed is small.

That is, the final speed command value is used as a criterion for determining the magnitude of the difference between the target speed and the current speed (a criterion for dividing section A and section B). Specifically, if the difference between the final speed command value and the current speed of the motor is greater than or equal to a preset reference range, which is the case where the difference between the target speed and the current speed is large, it is determined that it corresponds to section A. If the difference between the final speed command value and current speed of the motor is less than the preset reference range, which is the case where the difference between the target speed and the current speed is small, it is determined that it corresponds to section B at S321.

Then, if it corresponds to section A, the first phase current limit value is determined as the final phase current limit value at S322, and if it corresponds to section B, the second phase current limit value is determined as the final phase current limit value at S323.

For reference, here, the reference range is the data accumulated through various experiments in advance, and may be understood to refer to a value stored in a memory built in the control unit of the method for controlling the air compressor of the fuel cell system according to the present disclosure.

Subsequently, in the step S330 of deriving the final phase current command value from the final phase current limit value and the phase current specified value by the control unit, the phase current command value derived in the step S100 of deriving the target speed command value and the phase current command value is compared with the previously determined final phase current limit value, and the lower value of the phase current command value and the final phase current limit value can be derived as the final phase current command value.

As a result, the air compressor motor is controlled according to the final phase current command value derived in this way.

On the other hand, in the step S400 of controlling the air compressor motor of the method for controlling the air compressor of the fuel cell system according to the present disclosure, the voltage command of the motor is generated according to the final phase current command value, and the air compressor motor can be controlled according to the duty ratio corresponding to the generated voltage command.

That is, in the step S400 of controlling the air compressor motor, the voltage command of the motor is generated so that the desired voltage is applied to the air compressor motor according to the final phase current command value derived in the step (S300) of deriving the final phase current command value. Then, by transmitting a pulse width modulation (PWM) signal having the duty ratio corresponding to the generated voltage command, the air compressor motor is controlled.

In this case, the PWM signal having the duty ratio corresponding to the voltage command may be generated using a space vector PWM (SVPWM) method.

The transmission of the PWM signal having the duty ratio corresponding to the voltage command for controlling a motor is obvious in the art, and thus a more detailed description thereof will be omitted.

As a result, by controlling the air compressor motor in this way, it is possible to prevent the voltage drop of the fuel cell stack and increase the output of the air compressor motor.

FIG. 5 is a view showing a system for controlling an air compressor of a fuel cell system according to an embodiment of the present disclosure.

Referring to FIG. 5, a system for controlling the air compressor of the fuel cell system according to the present disclosure includes the command value derivation unit 110 for deriving the target speed command value of the motor and the phase current command value required for driving the motor based on the rotation speed of the air compressor motor, the limit value derivation unit 120 for deriving the speed limit value limiting the target speed command value and the phase current limit value limiting the phase current command value based on the sensing voltage of the motor, the final value derivation unit 130 for deriving the final phase current command value based on the target speed command value, the speed limit value, the phase current command value and the phase current limit value, and the motor control unit 140 for controlling the air compressor motor according to the final phase current command value.

At this time, the system for controlling the air compressor of the fuel cell system according to the present disclosure further includes a high-level control unit 200 that derives the target speed command value of the motor based on the rotation speed of the air compressor motor and transmits the derived target speed command value to the command value derivation unit 110 and the final value derivation unit 130. The command value derivation unit 110 may derive the phase current command value required for driving the motor based on the target speed command value received from the high-level control unit 200 and the rotation speed of the air compressor motor.

FIG. 5 shows an embodiment that further includes the high-level control unit 200, and the embodiment is illustrated as deriving the target speed command value from the high-level control unit 200 and transmitting the derived target speed command value to the command value derivation unit 110 to derive the phase current command value.

However, this is only an exemplary illustration for helping understanding of the present disclosure, and both the target speed command value and the phase current command value may be derived from the command value derivation unit 110 according to changes in various design conditions. That is, it should not be seen that the content of the present disclosure is limited by the representation of these drawings.

Hereinafter, as shown in FIG. 5, the high-level control unit 200 and the command value derivation unit 110 will be separately described.

Here, the high-level control unit 200 may be understood to refer to the fuel-cell control unit that is a high-level controller, as described above. In addition, the control unit 100 configured to include the command value derivation unit 110, the limit value derivation unit 120, the final value derivation unit 130 and the motor control unit 140 may be understood to refer to the aforementioned air compressor controller.

The function or role of each component will be examined in detail. First, the high-level control unit 200 derives the target speed command value based on the rotation speed of the motor. In this case, the rotation speed of the motor may be the target speed of the motor. The derived target speed command value is transmitted to the command value derivation unit 110 and the final value derivation unit 130.

Next, the command value derivation unit 110 derives the phase current command value through the received target speed command value and the rotation speed of the motor. Here, the rotation speed of the motor may be the current speed of the motor. The derived phase current command value is transmitted to the final value derivation unit 130.

Separately from the process of deriving the target speed command value and the phase current command value, the limit value derivation unit 120 senses the voltage of the air compressor motor. Then, if the sensing voltage of the motor is less than a reference voltage, the speed limit value and the phase current limit value are determined according to a preset limit speed value and the limit current value.

In this case, the phase current limit value may be divided into the first phase current limit value and the second phase current limit value according to a difference between the target speed and current speed of the motor. More specifically, if the difference between the target speed and current speed of the motor is large, the first phase current limit value can be derived, and if the difference between the target speed and the current speed is small, the second phase current limit value can be derived.

Furthermore, the power consumption limit value of the motor is determined according to a preset limit current value if the sensing voltage of the motor is less than a reference voltage, and the second phase current limit value is calculated and derived based on the determined power consumption limit value and the back electromotive force of the motor. Here, the back electromotive force of the motor may be understood to refer to a back electromotive force according to the current speed of the motor.

As such, the speed limit value, the first phase current limit value, and the second phase current limit value derived from the limit value derivation unit 120 are transmitted to the final value derivation unit 130.

The final value derivation unit 130 compares the received target speed command value with the speed limit value, and derives the lower value of the speed command value and the speed limit value as the final speed command value.

Next, if the difference between the derived final speed command value and the current speed of the air compressor motor is greater than or equal to the reference range, the first phase current limit value is determined as the final phase current limit value, and if the difference is less than the reference range, the second phase current limit value is determined as the final phase current limit value.

The determined final phase current limit value is compared with the phase current command value received from the command value derivation unit 110, and the lower value of the final phase current limit value and the phase current command value is derived as the final phase current command value. The final phase current command value is transmitted to the motor control unit 140.

The motor control unit 140 generates the voltage command of the motor according to the received final phase current command value, and controls the air compressor motor by transmitting the PWM signal having the duty ratio corresponding to the generated voltage command. In this case, the PWM signal having the duty ratio corresponding to the voltage command may be generated using a space vector modulation method.

As a result, each component of the control unit 100 performs an individual function as described above, but is organically combined to control the air compressor motor, thereby preventing the voltage of the fuel cell stack from dropping and increasing the output of the air compressor motor.

For reference, the transmission/reception process between the respective components of the system for controlling the air compressor of the fuel cell system according to the present disclosure may be performed using a communication (e.g., CAN communication, Controller Area Network) method commonly used in relation to vehicle control.

Therefore, as described above, according to the method and system for controlling an air compressor of a fuel cell system according to the present disclosure, when the demand output of a vehicle equipped with a fuel cell system is changed, the rotation speed of the air compressor motor is limited according to the demand output, while simultaneously limiting the phase current and power consumption of the motor. Accordingly, it has the advantage of increasing the output of the air compressor motor while preventing the voltage drop of the fuel cell stack.

Although shown and described in relation to specific embodiments of the disclosure, it will be apparent to those of ordinary skill in the art that the present disclosure can be variously improved and changed without departing from the spirit of the present disclosure provided by the following claims.

The invention claimed is:

1. A method for controlling an air compressor of a fuel cell system comprising the steps of:

deriving, by a control unit, a target speed command value of an air compressor motor and a phase current command value required for driving the air compressor motor based on a rotation speed of the air compressor motor;

deriving, by the control unit, a speed limit value for limiting the target speed command value and a phase current limit value for limiting the phase current command value based on a sensing voltage of the air compressor motor;

deriving, by the control unit, a final phase current command value based on the target speed command value, the speed limit value, the phase current command value, and the phase current limit value; and controlling, by the control unit, the air compressor motor according to the final phase current command value;

wherein in the step of deriving the speed limit value and the phase current limit value:

the phase current limit value is divided into a first phase current limit value and a second phase current limit value according to a difference between a target speed and current speed of the air compressor motor;

the control unit derives the first phase current limit value if the difference between the target speed and current speed of the air compressor motor is large, and derives the second phase current limit value if the difference between the target speed and the current speed is small; and a power consumption limit value of the air compressor motor is determined according to a preset limit current value if the sensing voltage of the air compressor motor is less than a reference voltage, and the second phase current limit value is calculated and derived based on the determined power consumption limit value and a back electromotive force according to the current speed of the air compressor motor.

2. The method for controlling an air compressor of a fuel cell system according to claim 1, wherein in the step of deriving the target speed command value, the rotation speed of the air compressor motor is a target speed of the air compressor motor.

3. The method for controlling an air compressor of a fuel cell system according to claim 1, wherein in the step of deriving the phase current command value, the rotation speed of the air compressor motor is a current speed of the air compressor motor.

4. The method for controlling an air compressor of a fuel cell system according to claim 1, wherein in the step of deriving the speed limit value and the phase current limit value, if the sensing voltage of the air compressor motor is less than a reference voltage, the speed limit value is determined according to a preset speed limit value.

5. The method for controlling an air compressor of a fuel cell system according to claim 1, wherein in the step of deriving the speed limit value and the phase current limit value, if the sensing voltage of the air compressor motor is less than a reference voltage, the phase current limit value is determined according to a preset limit current value.

6. The method for controlling an air compressor of a fuel cell system according to claim 1, wherein in the step of deriving the speed limit value and the phase current limit value, the back electromotive force is derived from an electric angular velocity according to the current speed of the air compressor motor, and the derived back electromotive force and the power consumption limit value of the air compressor motor are applied to a voltage equation of the air compressor motor to derive the second phase current limit value.

7. The method for controlling an air compressor of a fuel cell system according to claim 1, wherein the step of deriving the final phase current command value includes the steps of:

deriving, by the control unit, a final speed command value from the target speed command value and the speed limit value;

deriving, by the control unit, a final phase current limit value from the final speed command value and the phase current limit value; and deriving, by the control unit, the final phase current command value from the final phase current limit value and a phase current specified value.

8. The method for controlling an air compressor of a fuel cell system according to claim 1, wherein in the step of controlling the air compressor motor, a voltage command of the motor is generated according to the final phase current command value, and the air compressor motor is controlled according to a duty ratio corresponding to the generated voltage command.

9. A system for controlling an air compressor of a fuel cell system comprising:

a control unit configured to derive a target speed command value of an air compressor motor and a phase current command value required for driving the air compressor motor based on a rotation speed of the air compressor motor;

the control unit being further configured to derive a speed limit value limiting the target speed command value and a phase current limit value limiting the phase current command value based on a sensing voltage of the air compressor motor;

the control unit being further configured to derive a final phase current command value based on the target speed command value, the speed limit value, the phase current command value and the phase current limit value; and the control unit being further configured to control the air compressor motor according to the final phase current command value;

wherein when the speed limit value and the phase current limit value are derived, the phase current limit value is divided into a first phase current limit value and a second phase current limit value according to a difference between a target speed and current speed of the air compressor motor, and the control unit derives the first phase current limit value if the difference between the target speed and current speed of the air compressor motor is large, and derives the second phase current limit value if the difference between the target speed and the current speed is small; and wherein when the speed limit value and the phase current limit value are derived, a power consumption limit value of the air compressor motor is determined according to a preset limit current value if the sensing voltage of the air compressor motor is less than a reference voltage, and the second phase current limit value is calculated and derived based on the determined power consumption limit value and a back electromotive force according to the current speed of the air compressor motor.

10. The system for controlling an air compressor of a fuel cell system according to claim 9, further comprising a high-level control unit for deriving the target speed command value of the air compressor motor based on the rotation speed of the air compressor motor and transmitting the derived target speed command value to the control unit, wherein the control unit derives the phase current command value required for driving the air compressor motor based on the target speed command value received from the high-level control unit and the rotation speed of the air compressor motor.

* * * * *